(12) United States Patent
Lin et al.

(10) Patent No.: US 6,443,020 B1
(45) Date of Patent: Sep. 3, 2002

(54) STEERING COLUMN DIFFERENTIAL ANGLE POSITION SENSOR

(75) Inventors: Yingjie Lin; Warren Baxter Nicholson; Steven Douglas Thomson, all of El Paso, TX (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/663,473

(22) Filed: Sep. 15, 2000

(51) Int. Cl.[7] ................................................. G01L 3/02
(52) U.S. Cl. ................................................. 73/862.334
(58) Field of Search ..................... 73/862.328, 862.329, 73/862.331, 862.334, 862.339; 324/207.25, 862.334

(56) References Cited

U.S. PATENT DOCUMENTS

| | | | | | |
|---|---|---|---|---|---|
| 3,846,788 A | * | 11/1974 | Calabro et al. | .......... | 340/347 P |
| 4,244,219 A | * | 1/1981 | Takahashi | .................... | 318/482 |
| 4,356,732 A | * | 11/1982 | Hachtel et al. | ............... | 336/30 |
| 4,703,821 A | * | 11/1987 | Shimizu | ..................... | 180/446 |
| 4,785,242 A | * | 11/1988 | Vaidya et al. | ............... | 324/208 |
| 4,805,463 A | * | 2/1989 | Kelledes et al. | ............... | 336/30 |
| 4,881,414 A | * | 11/1989 | Setaka et al. | .......... | 324/207.18 |
| 4,907,460 A | * | 3/1990 | Taniguchi et al. | ..... | 73/862.331 |
| 5,369,583 A | * | 11/1994 | Hazelden | ............... | 364/424.05 |
| 5,570,016 A | * | 10/1996 | Shroeder et al. | ....... | 324/207.25 |
| 5,754,042 A | * | 5/1998 | Shroeder et al. | ....... | 324/207.25 |

* cited by examiner

Primary Examiner—Max Noori
(74) Attorney, Agent, or Firm—Margaret A. Dobrowitsky

(57) ABSTRACT

A steering column differential angle position sensor includes an upper target wheel and a lower target wheel. Each target wheel forms a plurality of similarly shaped slots that are equally spaced radially around the target wheels. Two receiver coils and a excitation coil are coaxially aligned with the target wheels. A hollow housing surrounds the target wheels and the coils. The excitation coil generates an alternating current magnetic field around itself, and this alternating current magnetic field generates eddy current in the target wheels. The receiver coils receive an alternating current signal that is a combination of the alternating current magnetic field generated by the excitation coil and the eddy current. The receiver coils sense changes in the alternating current signal due to differential slot alignment of the target wheels, and hence, the torque on a steering column that is mechanically coupled to the sensor.

13 Claims, 3 Drawing Sheets

US 6,443,020 B1

STEERING COLUMN DIFFERENTIAL ANGLE POSITION SENSOR

TECHNICAL FIELD

The present invention relates to steering column torque sensors.

BACKGROUND OF THE INVENTION

Power assisted steering is a standard motor vehicle equipment feature. It happens that in order for a typical power steering control system to properly operate, a steering column torque sensor must be included in the system to close the control loop. Torque sensors, such as resistance strip/strain gauge sensors, capacitance sensors, magneto-elastic sensors, and transformer/strain gauge sensors, have been provided to determine the torque on the steering column. However, these sensors lack the sensitivity required for many of the present power steering control systems. Moreover, these sensors are extremely sensitive to changes in temperature and have limited durability.

The present invention has recognized the above-mentioned prior art drawbacks, and has provided the below-disclosed solutions to one or more of the prior art deficiencies.

SUMMARY OF THE INVENTION

A sensor for measuring differential angular displacement between an upper shaft segment and a lower shaft segment includes an upper target wheel that is coupled to the upper shaft segment and a lower target wheel that is coupled to the lower shaft segment. Each target wheel forms a plurality of slots and the lower target wheel is coaxially aligned with the upper target wheel. Moreover, the sensor includes at least one excitation coil that is energizable to create an alternating current magnetic field that, in turn, generates eddy currents in the target wheels. The sensor also includes at least one receiver coil that receives an alternating current signal. The amplitude of the receiving signal is a function of the combination of the alternating current magnetic field generated by the excitation coil and the eddy current blocking effects of the target wheels. Accordingly, the receiver coil senses a change in the alternating current signal reaching the receiver coil when the target wheels move relative to each other, and the sensor outputs a signal representative of the differential angular orientation of the target wheels.

In a preferred embodiment, a housing surrounds the coils and the target wheels. Furthermore, a torsion bar mechanically couples the upper shaft and the lower shaft. Preferably, the number of slots formed by each target wheel is equal to each other. The housing defines a vertical axis and the target wheels are disposed within the housing such that the wheels are perpendicular to the axis.

Also, in a preferred embodiment, the sensor includes at least one reference coil that is coaxially aligned with the target wheels. Moreover, the sensor includes a reference target wheel which may be one or both of the upper and lower target wheels. As intended by the preferred embodiment, the reference coil and the reference target wheel are used to compensate for changes in the sensor caused by temperature changes and changes caused by axial misalignment of the target wheels relative to the coils.

In another aspect of the present invention, a sensor for measuring differential angular displacement between an upper shaft segment and a lower shaft segment includes a target wheel that forms a plurality of slots. In this aspect of the present invention, the slots are arranged such that they from plural concentric rings. Furthermore, a plurality of constant area slots are formed which are unaffected when the target wheels rotate relative to each other.

In yet another aspect of the present invention, a power steering control system includes a microprocessor, a power source, and a steering column differential angle position sensor. The steering column differential angle position sensor is electrically coupled to the microprocessor, electrically coupled to the power source and mechanically coupled to a steering column. In this aspect of the present invention, the differential angle position sensor transmits a signal to the microprocessor that represents a differential angular displacement between an upper target wheel and a lower target wheel. The signal varies based on slot alignments between the target wheels.

In still another aspect of the present invention, a method for controlling a power steering system includes installing an upper target wheel a first steering shaft segment and installing a lower target wheel on a second steering shaft segment. Each target wheel has plural slots. The method also includes determining a differential angular position between the upper target wheel and the lower target wheel based on an alignment of the slots.

In yet still another aspect of the present invention, a target wheel is used in a sensor for measuring differential angular displacement between an upper shaft segment and a lower shaft segment. The target wheel forms a plurality of concentric circular rows of slots. The rows alternately form relatively narrow slots and relatively wide slots. In this aspect of the present invention, the slots are somewhat rectangular and curved to match the periphery of the target wheel.

In yet another aspect of the present invention, the target wheels form a plurality of slots that form a constant area regardless of the different position of the target wheels. In this aspect a reference signal can pass through to a reference coil, forming the basis for thermal and mechanical corrections.

The present invention will now be described, by way of example, with reference to the accompanying drawings, in which:

DESCRIPTION OF AN EMBODIMENT OF THE INVENTION

Figure 1:
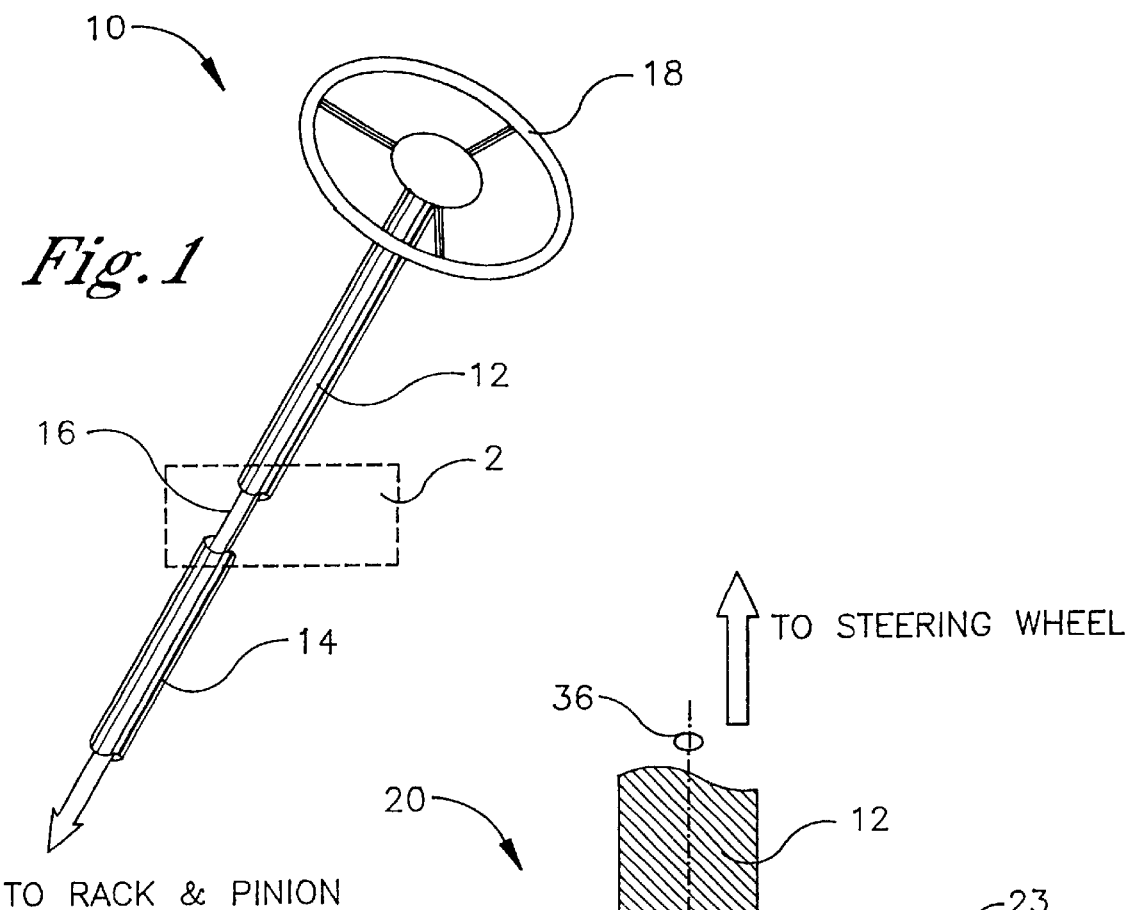
FIG. 1 is a perspective view of a steering column.

Referring initially to FIG. 1, a motor vehicle steering column is shown and generally designated 10. FIG. 1 shows that the steering column includes an upper steering shaft 12 and a lower steering shaft 14 connected by a torsion bar 16. As shown in FIG. 1, the upper steering shaft 12 is connected to a steering wheel 18. The lower steering shaft 14 is connected to a rack and pinion (not shown) or other steering mechanism coupled to the wheels of a vehicle. It is to be appreciated that the steering column differential angle position sensor, described below, is installed along the steering column 10 at the junction of the upper and lower steering shafts 12, 14, i.e., around the torsion bar 16 in the area indicated by dashed box 2.

Figure 2:
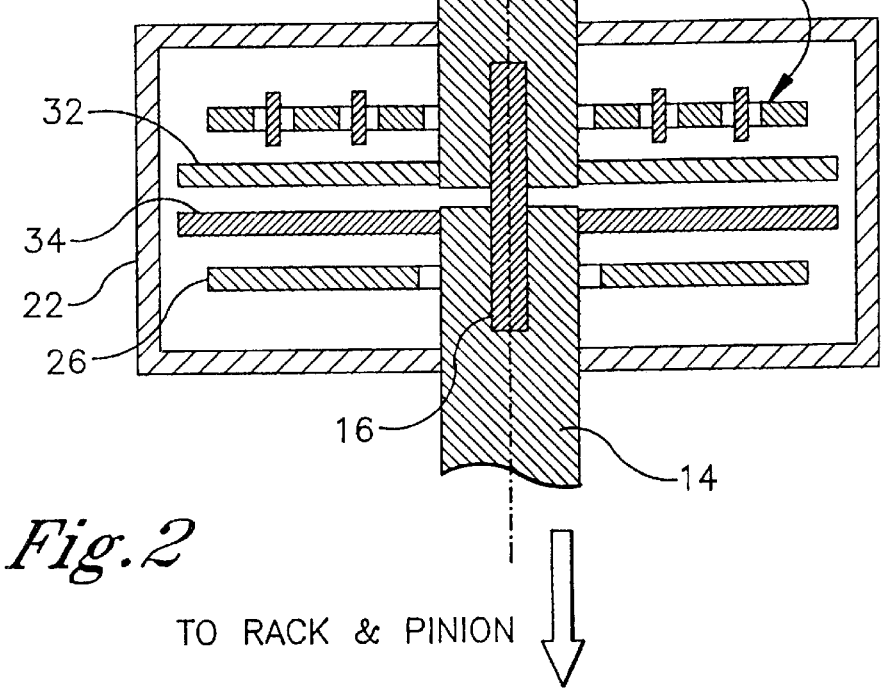
FIG. 2 is a cross-sectional view of a steering column differential angle position sensor as seen in box 2 in FIG. 1.

Referring to FIG. 2, a steering column differential angle position sensor is shown and generally designated 20. FIG. 2 shows that the steering column differential angle position sensor 20 includes a hollow, toroidal housing 22 that, in a preferred embodiment, is manufactured from a non-ferromagnetic material. Within the housing 22 and circumscribing the upper steering shaft 12, is a generally ring-shaped receiver/reference coil assembly 23. Also, within the housing 22, but circumscribing the lower steering shaft 14 is a generally ring-shaped excitation coil 26.

Continuing to refer to FIG. 2, a generally ring-shaped upper target wheel 32 and a generally ring-shaped lower target wheel 34 are disposed within the sensor housing 22. Preferably, the upper target wheel 32 and lower target wheel 34 are manufactured from a conductive material, e.g., copper. FIG. 2 shows that the upper target wheel 32 is rigidly affixed to the upper steering shaft 12 and rotates with the upper steering shaft 12. Conversely, the lower target wheel 34 is rigidly affixed to the lower steering shaft 14 and, accordingly, rotates therewith. It may now be appreciated that any torque on the upper steering shaft 12 will turn the upper target wheel 32 relative to the lower target wheel 34.

FIG. 2 shows that the target wheels 32, 34 are installed within the housing 22 such that they are parallel to each other, parallel to the receiver/reference coil assembly 23, and parallel to the excitation coil 26. As shown in FIG. 2, the steering shafts 12, 14 define an axis 36 and the sensor 20 is installed around the steering shafts 12, 14 such that the internal components of the sensor 20, e.g., the receiver/reference coil assembly 23, the excitation coil 26, and the target wheels 32, 34, are perpendicular to the axis 36. Moreover, the target wheels 32, 34, the receiver/reference coil assembly 23, and the excitation coil 26 are coaxially aligned with each other within the housing 22 along the axis 36.

Figure 2A:
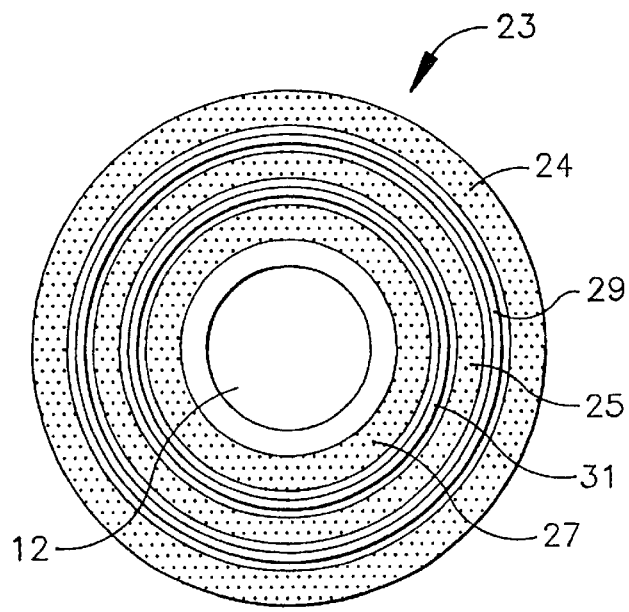
FIG. 2A is a top plan view of the receiver/reference coil assembly.

Referring to FIG. 2A, details concerning the construction of the receiver/reference coil assembly 23 are shown. FIG. 2A shows that the receiver/reference coil assembly 23 includes a first ring-shaped receiver coil 24, a ring-shaped reference coil 25, and a second ring-shaped receiver coil 27. As shown in FIG. 2A, the first receiver coil 24 is separated from the reference coil 25 by a first isolation ring 29. Moreover, the reference coil 25 is separated from the second receiver coil 27 by a second isolation ring 31. It is to be understood that the receiver coils 24, 27 are co-planar with the reference coil 25. Also, the receiver coils 24, 27, the reference coil 25, and the isolation rings 29, 31 are concentric to each other around the center of the upper steering shaft 12. It is to be appreciated that the reference coil 25 is isolated from variable field lines by the isolation rings 29, 31.

Figure 3:
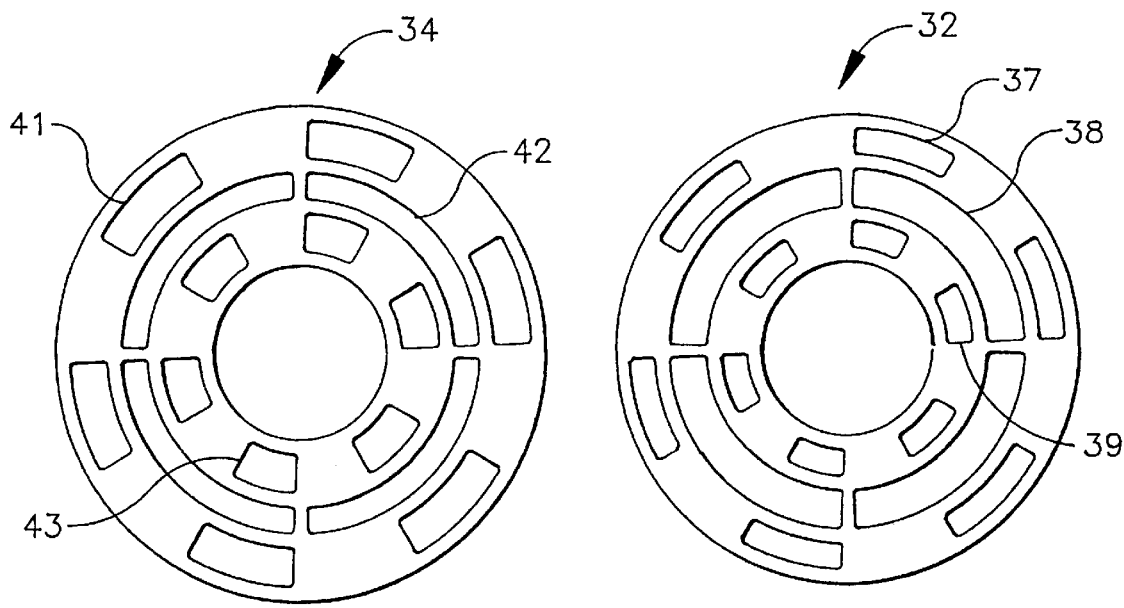
FIG. 3 is a top plan view of the upper target wheel and the lower target wheel.
Figure 3A:
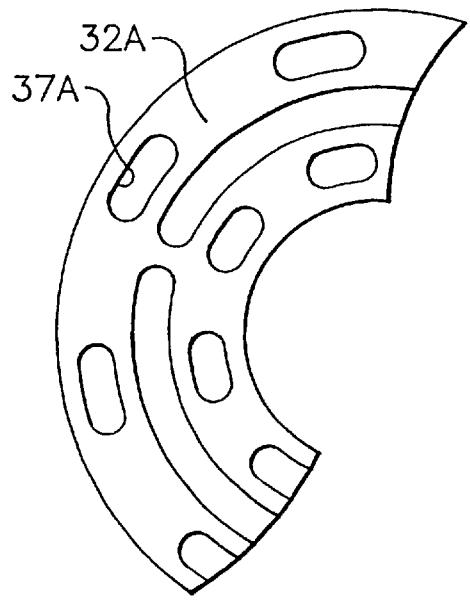
FIG. 3a is a top plan view of an alternative target wheel.

Referring now to FIG. 3, the preferred upper target wheel 32 and preferred lower target wheel 34 are shown. FIG. 3 shows that the upper target wheel 32 is formed with a first circular row of relatively narrow, relatively short slots 37, a second circular row of relatively wide, relatively long 38 slots, and a third circular row of relatively narrow, relatively short slots 39. On the other hand, the lower target wheel 34 is formed with a first circular row of relatively wide, relatively short slots 41, a second circular row of relatively narrow, relatively long slots 42, and a third circular row of relatively wide, relatively short slots 43. Preferably, the slots 37, 38, 39, 41, 42, 43 are somewhat rectangular, but curved to match the periphery of the target wheels 32, 34. Or, as shown in FIG. 3A, slots 37A can be provided that are elongated, e.g., oblong as shown, with the dimension of elongation perpendicular to the radius of the target wheel 32A.

It is to be appreciated that the target wheels 32, 34 are formed such that as the target wheels 32, 34 move relative to each other, the relatively wide, relatively long slots 38 formed by the upper target wheel 32 pass over the relatively narrow, relatively long slots 42 formed by the lower target wheel 34. On the other hand, the relatively narrow, relatively short slots 37, 39 formed by the upper target wheel 32 pass over the relatively wide, relatively short slots 41, 43 formed by the lower target wheel 34.

Referring back to FIG. 3, in each circular row, the slots 37, 38, 39, 41, 42, 43 are equally radially spaced around the target wheel 32, 34. Moreover, as shown in FIG. 3, the circular rows of slots 37, 38, 39, 41, 42, 43 are concentric with each other around the center of the target wheels 32, 34. It is to be appreciated that the size, i.e., length, of the slots 37, 38, 39, 41, 42, 43 can be established depending on the measurement range of the sensor 20 and the transfer function of the magnetic circuit formed by the coils 24, 26 and the target wheels 32, 34. It is to be further appreciated that the length and placement of the relatively long slots 38, 42 are such that a constant straight through open area is formed regardless of the differential rotation of the target wheels 32, 34 within the measurement range.

Without any torque applied to the torsion bar 16, in one preferred embodiment, the relatively short slots 37, 39 formed by the upper target wheel 32 and the relatively short slots 41, 43 formed by the lower target wheel 34 are approximately fifty percent (50%) overlapped. Accordingly, at zero torque, approximately fifty percent (50%) of the total possible open area of the target wheels 32, 34 between the excitation coil 26 and the receiver coils 24, 27 is available. However, when a torque is applied to the upper steering shaft 12 relative to the lower shaft 14, e.g., when road friction is present, the torsion bar 16 twists at a predetermined spring rate. The twisting of the torsion bar 16 creates a differential angle between the target wheels 32, 34 which changes the open area through the relatively short slots 37, 39, 41, 43 formed by the target wheels 32, 34. The direction of applied torque, either clockwise or counter-clockwise, is also of interest. When a torque is applied in one direction on the upper shaft 12, the open area through the relatively short slots 37, 39, 41, 43 formed by the target wheels 32, 34 will increase from fifty percent (50%) to one hundred percent (100%). On the other hand, when a torque is applied to the upper shaft 12 in the opposite direction, the open area through the relatively short slots 37, 39, 41, 43 formed by the target wheels 32, 34 decreases from fifty percent (50%) to zero percent (0%). As the area through the relatively short slots 37, 39, 41, 43 formed by the target wheels 32, 34 increases, the signal reaching the receiver coil 24 increases, and as such, the voltage present across the receiver coil 24 increases. Likewise, as the area through the relatively short slots 37, 39, 41, 43 formed by the target wheels 32, 34 decreases, the voltage across the receiver coil 24 decreases. The change in voltage at the receiver coil 24 is used to determine the differential angle between the upper target wheel 32 and the lower target wheel 34. Moreover, the direction of motion between the target wheels 32, 34 can be determined. The relatively long slots 38, 42 formed by the target wheels 32, 34 create an overlap area which is constantly open regardless of the differential rotation of the target wheels.

By knowing the differential angle between the upper target wheel 32 and the lower target wheel 34 the angle of twist between the top and bottom of the torsion bar 16 can be determined. As is known in the art, the angle of twist of the torsion bar, along with the length of the torsion spring rate (N-m/degree) of the torsion bar 16 can be used to determine the torque required to move the tires and a steering control system can compensate accordingly.

By energizing the excitation coil 26 with a fixed frequency alternating current (AC) source, an AC magnetic field is generated around the excitation coil 26. In turn, the AC magnetic field generates eddy currents on the target wheels 32, 34, and the eddy currents generate a second AC magnet field that opposes the AC field created by the excitation coil 26. Since the target wheels 32, 34 are installed between the excitation coil 26 and the receiver coils 24, 27, the receiver coils 24, 27 receive the AC signal that is the difference between the field generated by the excitation coil 26 and the eddy current blocking effect of the target wheels 32, 34. Thus, by using the receiver coils 24, 27 to sense changes in the AC signal caused by relative motion between the upper and lower target wheels 32, 34, a torque on the steering column 10 can be determined by a microprocessor, described below. As intended herein, the reference coil 25 and the upper target wheel 32, which acts as a reference target wheel, are used to provide a reference output that varies due to temperature changes in the target wheels 32, 34 and changes due to axial misalignment of the target wheels 32, 34 relative to the receiver coils 24, 27. The reference sensor output is used to compensate the main sensor output due to the temperature effects and misalignment effects, and its compensation signal is protected from the sensor's differential signal by the isolation rings 29, 31.

Figure 4:
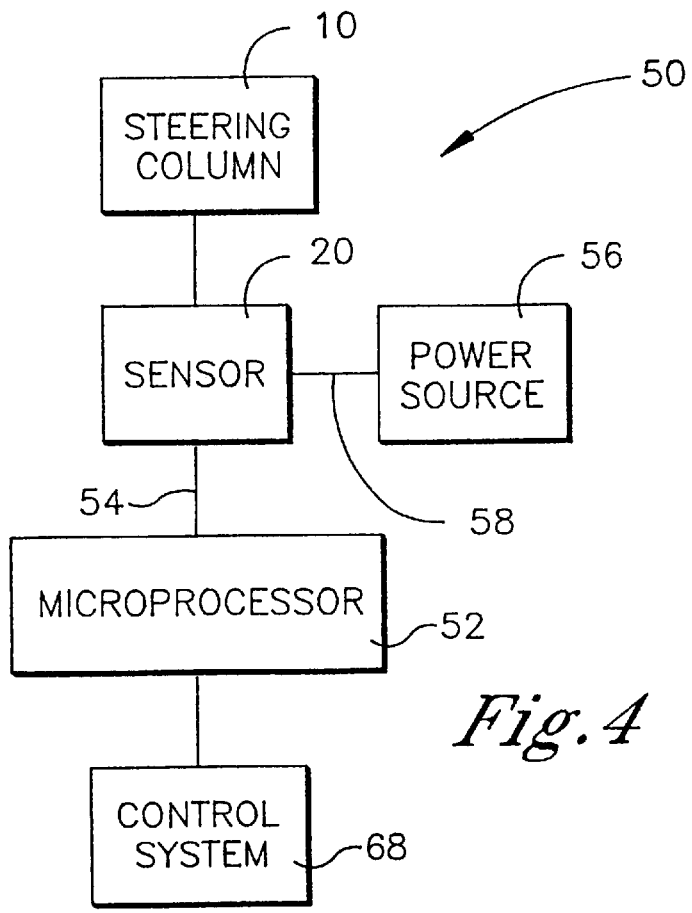
FIG. 4 is a block diagram representing a vehicle steering control system.

Referring now to FIG. 4, a block diagram representing a steering system is shown and designated 50. FIG. 4 shows that the steering system 50 includes the steering column differential angle position sensor 20, which is electrically coupled to a microprocessor 52 via electrical line 54. FIG. 4 also shows that the steering column differential angle position sensor 20 is electrically coupled to a power source 56 via electrical line 58 and mechanically coupled to the steering column 10 as described above.

Accordingly, the microprocessor 52 processes the signals sent from the sensor 20 to determine a steering column 10 torque based on the known torsion bar spring rate and the differential angular positions of the upper and lower target wheels 32, 34. The microprocessor 52 can then control a control system 68, e.g., a power steering assist system, using the steering column 10 differential angular position signal.

With the configuration of structure described above, it is to be appreciated that the steering column differential angle position sensor 20 provides a relatively sensitive, relatively compact, and relatively durable means for determining the torque on a steering column 10 based on the change in signal reaching the receiver coils 24, 27 due to the effects by the eddy currents generated by the excitation coil 26 caused by relative motion between the upper target wheel 32 and the lower target wheel 34.

While the particular steering column differential angle position sensor 20 as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A sensor for measuring differential angular displacement between an upper shaft segment and a lower shaft segment, comprising:

an upper ring-shaped target wheel coupled to the upper shaft segment, the upper target wheel forming a plurality of enclosed slots;

a lower ring-shaped target wheel coupled to the lower shaft segment and coaxially aligned with the upper target wheel, the lower target wheel forming a plurality of enclosed slots;

at least one excitation coil energizable to create an alternating current magnetic field that generates eddy current in the target wheels, the excitation coil being coaxial with the upper and lower target wheels and placed below the upper and lower target wheels; and at least one ring-shaped receiver/reference coil assembly placed above the upper and lower target wheels, the receiver/reference coil assembly including at least one ring-shaped receiver coil and at least one ring shaped reference coil within the ring-shaped receiver coil, the ring-shaped reference coil being concentric to the ring-shaped receiver coil.

2. The sensor of claim 1, wherein in the receiver/reference coil assembly further includes:

at least one isolation ring between the receiver coil and the reference coil.

3. The sensor of claim 1 wherein the receiver/reference coil is coaxial with the upper and lower target wheels and the excitation coil.

4. A sensor for measuring differential angular displacement between an upper shaft segment and a lower shaft segment, comprising:

an upper ring-shaped target wheel coupled to the upper shaft segment, the upper target wheel forming a plurality of enclosed slots;

a lower ring-shaped target wheel coupled to the lower shaft segment and coaxially aligned with the upper target wheel, the lower target wheel forming a plurality of enclosed slots;

at least one excitation coil energizable to create an alternating current magnetic field that generates eddy current in the target wheels, the excitation coil being coaxial with the upper and lower target wheels and placed below the upper and lower target wheels; and at least one ring-shaped receiver/reference coil assembly placed above the upper and lower target wheels, the ring-shaped receiver/reference coil assembly having a first ring-shaped receiver coil, a ring shaped reference coil within the ring-shaped receiver coil and a second ring-shaped receiver coil within the reference coil, the ring-shaped reference coil being concentric to the first ring-shaped receiver coil and the second receiver coil being concentric to the first receiver coil and the reference coil.

5. The sensor of claim 4, wherein in the receiver/reference coil assembly further includes:

a first isolation ring between the first receiver coil and the reference coil.

6. The sensor of claim 5, wherein in the receiver/reference coil assembly further includes:

a second isolation ring between the second receiver coil and the reference coil.

7. The sensor of claim 4 wherein the receiver/reference coil is coaxial with the upper and lower target wheels and the excitation coil.

8. A method for controlling a power steering system comprising the acts of:

installing an upper ring-shaped target wheel having plural enclosed slots on a first steering shaft segment;

installing a lower ring-shaped target wheel having plural enclosed slots on a second steering shaft segment;

installing an excitation coil below the lower target wheel;

installing a receiver/reference coil assembly above the upper target wheel, the receiver/reference coil assembly having a first ring-shaped receiver coil, a ring shaped reference coil within the ring-shaped receiver coil, and a second ring-shaped receiver coil within the reference coil, the ring-shaped reference coil being concentric to the first ring-shaped receiver coil and the second receiver coil being concentric to the first receiver coil and the reference coil; and determining a differential angular position between the upper target wheel and the lower target wheel based on an alignment of the slots.

9. The method of claim 8, further comprising the act of:

generating a signal representing the differential angular position.

10. The method of claim 9, further comprising the act of:

processing the signal to determine a torque on a steering column based on the differential angular position.

11. The method of claim 10, further comprising the act of:

sending a signal representing the torque on the steering column to a control system.

12. The method of claim 8, wherein in the receiver/reference coil assembly further includes:

a first isolation ring between the first receiver coil and the reference coil.

13. The method of claim 12, wherein in the receiver/reference coil assembly further includes:

a second isolation ring between the second receiver coil and the reference coil.

* * * * *